US006483812B1

(12) United States Patent
Prorock (10) Patent No.: US 6,483,812 B1
(45) Date of Patent: Nov. 19, 2002

(54) TOKEN RING NETWORK TOPOLOGY DISCOVERY AND DISPLAY

(75) Inventor: Thomas Joseph Prorock, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/226,769

(22) Filed: Jan. 6, 1999

(51) Int. Cl.[7] .................................................. H04J 1/16
(52) U.S. Cl. ....................................... 370/252; 370/254
(58) Field of Search ................................. 370/351, 352, 370/401, 402, 403, 404, 405, 406, 409, 410, 471, 475, 476, 241, 242, 244, 247, 248, 249, 250, 252, 258, 254, 224, 465, 347

(56) References Cited

U.S. PATENT DOCUMENTS

| 4,507,777 | A | | 3/1985 | Tucker et al. ................... 370/16 |
|---|---|---|---|---|
| 5,084,870 | A | | 1/1992 | Hutchison et al. .......... 370/94.1 |
| 5,305,306 | A | | 4/1994 | Spinney et al. ................. 370/39 |
| 5,363,366 | A | | 11/1994 | Wisdom et al. ................. 370/13 |
| 5,444,695 | A | | 8/1995 | Copley et al. .................. 370/17 |
| 5,485,455 | A | * | 1/1996 | Dobbins et al. ............. 370/400 |
| 5,539,727 | A | | 7/1996 | Kramarczyk et al. ....... 370/16.1 |
| 5,684,959 | A | | 11/1997 | Bhat et al. .............. 395/200.11 |
| 6,266,336 | B1 | * | 7/2001 | Siegel et al. ................. 370/405 |
| 6,331,985 | B1 | * | 12/2001 | Coden ......................... 370/405 |

* cited by examiner

Primary Examiner—Dang Ton
(74) Attorney, Agent, or Firm—J. Bruce Schelkopf; Andrew J. Dillon

(57) ABSTRACT

A method and system for determining the topology of a communications network that utilizes routing information fields contained within transmission frames for controlling routine transmissions. First, a plurality of transmission frames associated with routine data transmissions are collected. Next, a plurality of routing information fields are extracted from the plurality of transmission frames. Thereafter, the plurality of routing information frames are analyzed and parsed, thereby yielding interconnected topology data. Finally, the interconnected topology data from the plurality of routing information fields is converted and stored into programming language data objects, such that the data objects may thereafter be utilized to display the interconnected topology of the communications network.

26 Claims, 6 Drawing Sheets

TOKEN RING NETWORK TOPOLOGY DISCOVERY AND DISPLAY

BACKGROUND OF THE INVENTION

1. Technical Field

The present invention relates in general to an improved method and system for managing communications networks. In particular, the present invention relates to a method and system for efficiently acquiring topology information associated with a communications network. More particularly, the present invention relates to a method and system for utilizing token ring information frames such that the topology of a token ring bridged network can be discovered and displayed. Still more particularly, the present invention provides a method and system for extracting token ring network topology information utilizing extant token ring routing information frames and storing the topology information into data objects such that the interconnected topology of the token ring bridged network may be ascertained in real time without increasing network traffic.

2. Description of the Related Art

A Local Area Network or "LAN" is a combination of computers and other communications devices that is dispersed over a relatively limited geographic area and connected by some form of communications link. LANs are characterized by the sharing of network resources such as printers or a shared array of hard disk drives, among several microcomputers. The individual devices on a LAN are commonly referred to as nodes which are connected by some connective media such as electrical cables over which messages are transmitted. Currently, there are several distinguishable types of LANs including: ring networks, star networks, token ring networks, and token ring bridged networks.

In general, the title "token ring network" denotes a network that utilizes a ring topology, in which information contained within transmission frames is passed in a circuit from node to node. A transmission frame, referred to interchangeably as an "information packet", is a well understood data transmission entity that, in the context of a token ring network, is a bit pattern containing data that a node has inserted for transmission after "capturing" the token. A "token", in this context, is a particular message or bit pattern contained within a transmission frame, that is passed along from one device to the next in a ring network. In this manner, a node that is ready to send, can capture the token and insert data for transmission. Therefore, a token ring network is characterized by a token, that governs the transmission of data from one network device to the next in what amounts to a loop. Token ring networks are further defined in the IEEE 802.5 standards which are incorporated herein in their entirety by reference thereto.

Token ring bridged networks are larger and more complex networks comprising multiple token ring LANs. Devices utilized to connect such networks are known in the art as "bridges". Various network protocols can be utilized within bridged networks and one such protocol frequently utilized within connected token ring networks, is known as source route bridging. When source route bridging protocol is utilized, each individual token ring network is referred to as a "segment". Token ring bridged networks that utilize source route bridging protocol are known as token ring source route bridge networks.

The development of computerized information resources, such as LANs, allows users of data-processing systems to link with other servers and networks, and thus retrieve vast amounts of electronic information heretofore unavailable in an electronic medium. Such electronic information is increasingly displacing more conventional means of information transmission, such as newspapers, magazines, and even television. As LANs continue to proliferate, and the number of personal computers (PCs) that connect to these LANs continue to grow at a rapid pace, the availability of good network management tools becomes ever more important for effective network administration. Network administrators rely heavily on tools that graphically portray a network to ease the task of network management. Network topology information is particularly useful to network administrators when performing such management tasks as diagnosing problems in the network and performing administrative tasks such as adding, removing or rearranging network devices.

The number of network tools currently utilized to map token ring network topology is rather limited. These network tools include IBM's Lan Network Manager (LNM) for OS/2 and IBM's LNM for AIX. These tools are useful in many tasks involved in network management including determination of network topology. However, the method by which these network management tools determines the topology of a network involves generating specialized "discovery" data packets. These specialized packets are often logical link control (LLC) test frames, which must be added to already existing data packets on a shared medium such as a network cable. The problem presented in such a scheme is two-fold: First, effort in the form of computing resources must be expended to create and manage these "discovery" packets, and, second, network traffic may be substantially increased to the detriment of network communications efficiency. This two-fold problem is compounded when such tools are utilized to gather topology information for token ring bridged networks, due to the increase size and complexity of such networks. As an alternative to utilizing currently existing network management programs to determine network topology, some network administrators utilize more manual, labor intensive methods to track and manage the various forms of computer networks.

From the foregoing, it can be seen that a need exists for a method and system to gather comprehensive information relating to the topology of a token ring bridged network, such as a token ring source route bridge network, and convert the collected topology information into data objects, such that the complete interconnected topology of the network may be ascertained and displayed in real time.

SUMMARY OF THE INVENTION

It is therefore an object of the invention to provide an improved method and system for managing communications networks.

It is another object of the invention to provide a method and system for efficiently acquiring topology information associated with a communications network.

It is still another object of the invention to utilize token ring information packets such that the topology of a token ring bridged network can be discovered and displayed.

It is a further object of the invention to extract and collect token ring network topology information utilizing extant token ring routing information packets and store the topology information into data objects such that the interconnected topology of a token ring bridged network may be ascertained in real time and displayed without increasing network traffic.

The above and other objects are achieved as is now described. A method and system are disclosed for determining the topology of a communications network that utilizes routing information fields contained within transmission frames for controlling routine transmissions. First, a plurality of transmission frames associated with routine data transmissions are collected. Next, a plurality of routing information fields are extracted from the plurality of transmission frames. Thereafter, the plurality of routing information frames are analyzed and parsed, thereby yielding interconnected topology data. Finally, the interconnected topology data from the plurality of routing information fields is converted and stored into programming language data objects, such that the data objects may thereafter be utilized to display the interconnected topology of the communications network.

DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DESCRIPTION OF PREFERRED EMBODIMENT

The present invention introduces a new method and system by which the topology of complex and geographically dispersed token ring bridged networks may be determined and displayed in real time. Token ring networks are particularly amenable to such a method and system because of the structured manner in which information is passed from node to node by the utilizing transmission frames. As utilized hereinbelow, the terms "frame" and "transmission frame" are interchangeable, and denote a data structure that consists of fields, predetermined by a protocol, for the transmission of user data and control data. The composition of a frame, especially the number and type of fields, may vary according to the type of protocol. Source route bridge (SRB) is utilized as the protocol utilized within a bridged network upon which a preferred embodiment of the present invention may be implemented.

Within a token ring bridged network, a token ring transmission frame is systematically captured and released by nodes, often workstations, within a token ring segment. Token ring transmission frames include several fields of information including a routing information field (RIF). An example token ring frame format and its associated RIF are depicted and described in further detail in FIG. 4A and FIG. 4B. The RIF contains information regarding the logical layout of the particular token ring through which it is being passed. There are several types of frames that utilize RIF fields in the source route bridge (SRB) protocol. These frames include "All Routes" explorer frames and the "Single Route" explorer frames that are utilized by the SRB protocol itself to determine available paths through the token ring bridged network. Similar to the "All Routes" and "Single Route" explorer frames, standard token ring data transmission frames may also contain one or more RIF fields.

Figure 3:
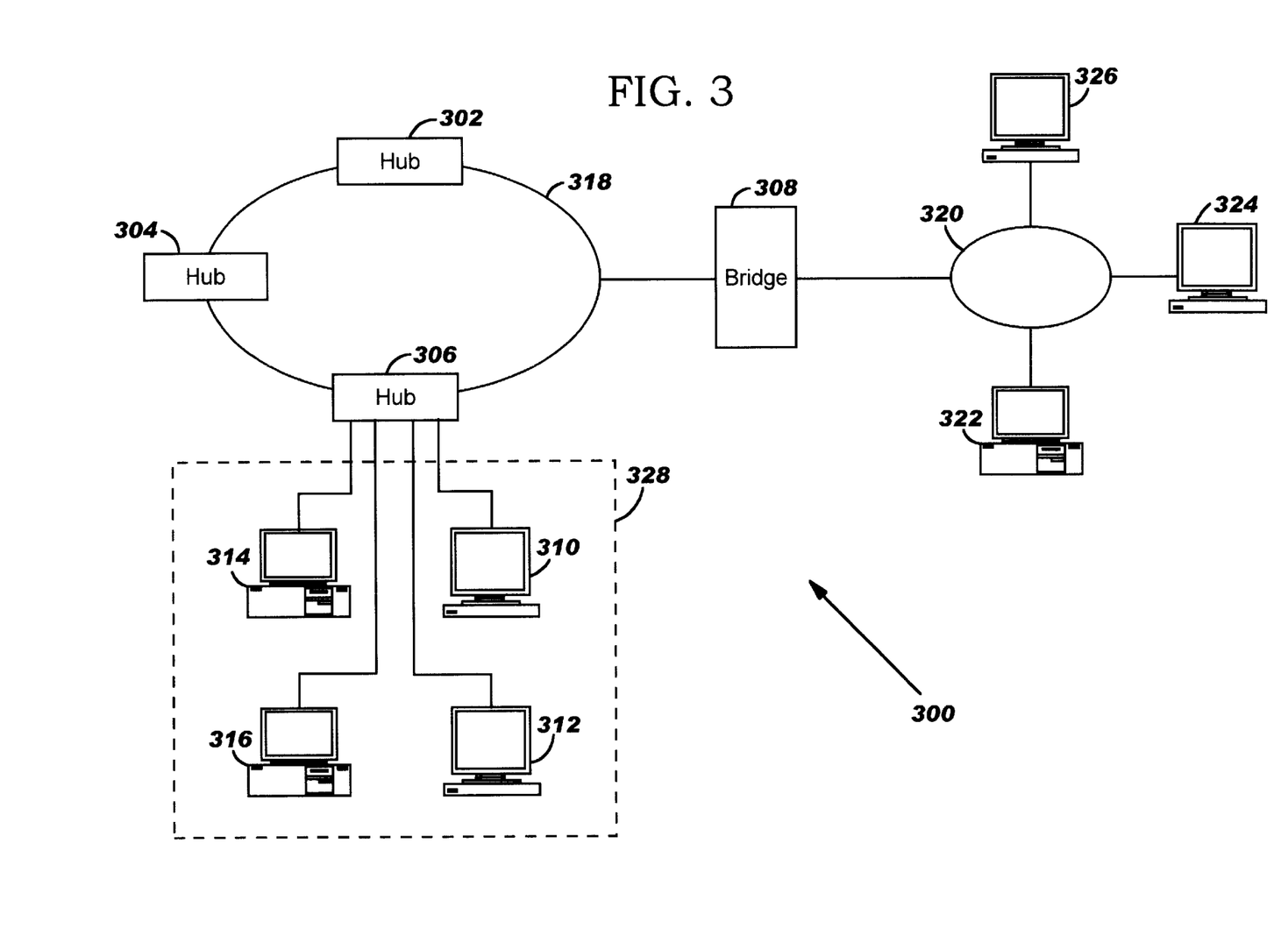
FIG. 3 is a simplified pictorial representation of a token ring source route bridge network upon which a preferred embodiment of the present invention may be implemented.

LANs are often formed by linking token rings by utilizing bridge devices. Within such a configuration, each token ring is referred to as a "segment". Such a configuration is depicted in FIG. 3, which illustrates a source route bridged communications network 300 comprising token ring segment 320 linked to token ring segment 318 via bridge 308. Source route bridging is one particular network protocol utilized for conducting inter-segment and intra-segment communications. In a source routing network, every node supplies each transmission frame it delivers with route descriptors, so that the frame can be routed across different segments of the network. The RIFs utilized within the transmission frames of such bridged networks contain information regarding the logical location of token ring segments within the network, and also, the logical location of nodes within each segment. Token ring transmission frames may also include information fields that contain the identity of a bridge over which the frame has passed. In what may be referred to as the "discovery phase" of the method and system of the present invention, this information may be collected at one or more network locations (utilizing a program at a particular node for example), thereby providing comprehensive network topology data. This discovery phase will be discussed in further detail in the description of FIG. 3 hereinbelow.

The method and system of the present invention provide an efficient means for first extracting and collecting topology information from RIFs contained within routine network transmission frames. The next phase involves analyzing and parsing the collected topology information packets into programming language data objects, such as JAVA objects. JAVA is a registered trademark of Sun Microsystems Corporation. This latter phase may be referred to as the "display phase" and will be explained in further detail hereinbelow.

Figure 1:
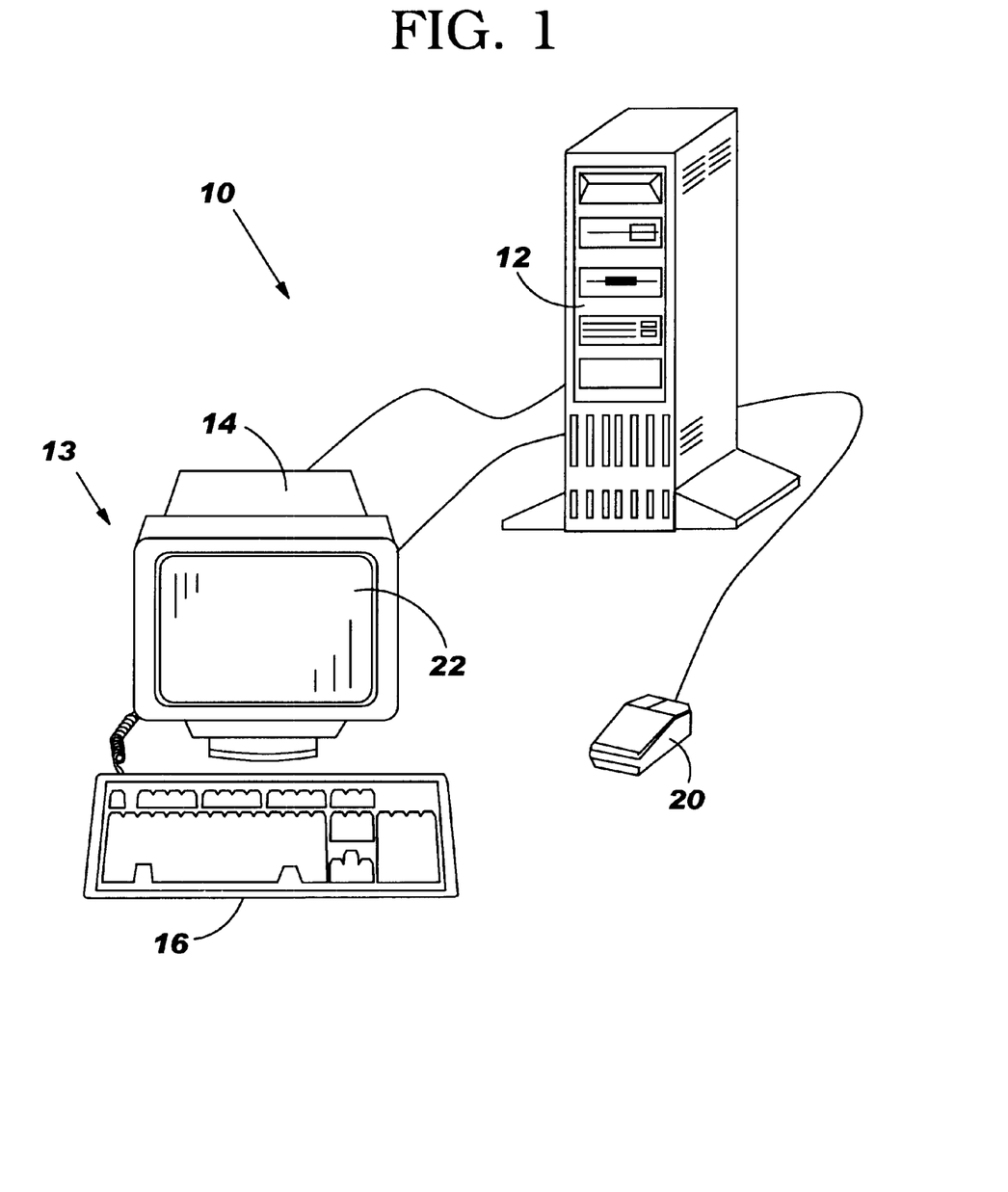
FIG. 1 illustrates a pictorial representation of a data processing system with which the method and system of the present invention may be implemented.

With reference now to FIG. 1, there is depicted a pictorial representation of a data processing system 10 with which the present invention may advantageously be utilized. As illustrated, data processing system 10 comprises a workstation 12 to which one or more peripheral devices 13 are connected. Workstation 12 may comprises a high performance multiprocessor computer, such as the RISC System/6000, available from International Business Machines Corporation (IBM), or a simple personal computer. Workstation 12 preferably includes nonvolatile and volatile internal storage for storing software applications comprising network analysis tools, which can be utilized to extract, collect, and analyze network topology information in accordance with the method and system of the present invention. As depicted, peripheral devices 13 are comprised of a display device 14, a keyboard 16, and a mouse 20. Software applications executed within workstation 12 preferably display a graphic user interface (GUI) within display screen 22 of display device 14 with which a user, such as a computer network manager, can interact using a keyboard 16 and mouse 20. Thus, by entering appropriate inputs utilizing keyboard 16 and mouse 20, the network manager is able to collect and maintain network topology information according to the method described further hereinbelow.

Figure 2:
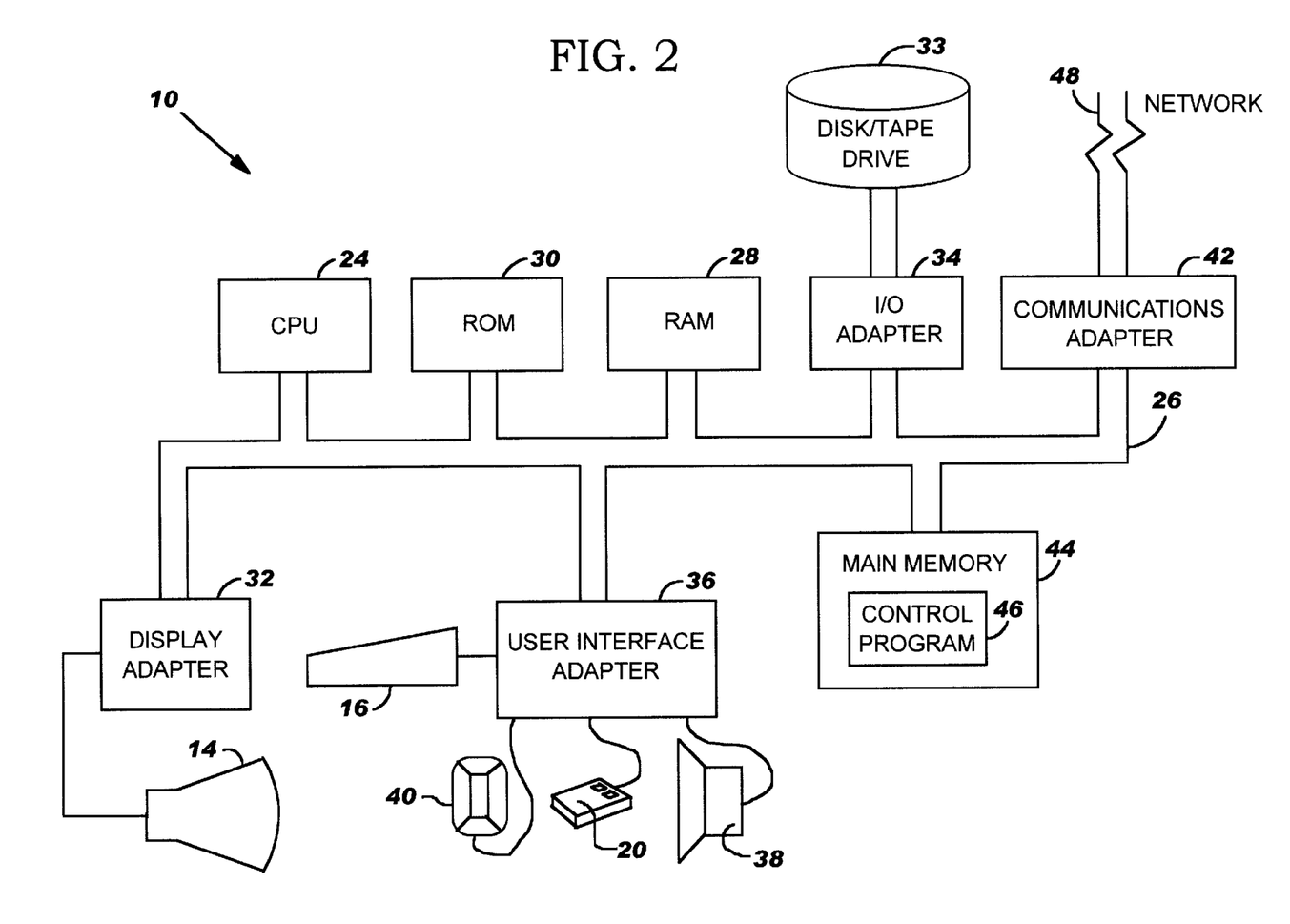
FIG. 2 depicts a representative hardware environment of the data processing system illustrated in FIG. 1.

FIG. 2 depicts a representative hardware environment of data processing system 10 illustrated in FIG. 1. In FIG. 1 and FIG. 2, like parts are identified by like numbers. Data processing system 10 in FIG. 2 is thus a configuration that includes all functional components of a computer and its associated hardware. Data processing system 10 includes a Central Processing Unit ("CPU") 24, such as a conventional microprocessor, and a number of other units interconnected via system bus 26. CPU 24 includes a portion of data processing system 10 that controls the operation of the entire computer system, including executing the arithmetical and logical functions contained in a particular computer program. Although not depicted in FIG. 2, CPUs such as CPU 24 typically include a control unit that organizes data and program storage in a computer memory and transfers the data and other information between the various parts of the computer system. Such CPUs also generally include an arithmetic unit that executes the arithmetical and logical operations, such as addition, comparison, multiplications and so forth. Such components and units of data processing system 10 can be implemented in a system unit such as workstation 12 of FIG. 1.

Data processing system 10 further includes random-access memory (RAM) 28, read-only memory (ROM) 30, display adapter 32 for connecting system bus 26 to display device 14, and I/O adapter 34 for connecting peripheral devices (e.g., disk and tape drives 33) to system bus 26. RAM 28 is a type of memory designed such that the location of data stored in it is independent of the content of such data. Also, any location in RAM 28 can be accessed directly without having to work through from the beginning. ROM 30 is a type of memory that retains information permanently and in which the stored information cannot be altered by a program or normal operation of a computer.

Display device 14 is the visual output of data processing system 10. Display device 14 can be a cathode-ray tube (CRT) based video display well-known in the art of computer hardware. However, with a portable or notebook-based computer, display device 14 can be replaced with a liquid crystal display (LCD) based or gas plasma-based flat-panel display. Data processing system 10 further includes user interface adapter 36 for connecting keyboard 16, mouse 20, speaker 38, microphone 40, and/or other user interface devices, such as a touch-screen device (not shown), to system bus 26. Speaker 38 is one type of audio device that may be utilized in association with the method and system provided herein to assist network managers, or other computer users, in obtaining feedback from information received by data processing system 10 regarding system failures, errors, and discrepancies. Communications adapter 42 connects data processing system 10 to a computer network, such as a Local Area Network (LAN) 48. Although data processing system 10 is shown to contain only a single CPU and a single system bus, it should be understood that the present invention applies equally to computer systems that have multiple CPUs and to computer systems that have multiple buses that each perform different functions in different ways.

Data processing system 10 also includes an interface that resides within a machine-readable media to direct the operation of data processing system 10. Any suitable machine-readable media may retain the interface, such as RAM 28, ROM 30, a magnetic disk, magnetic tape, or optical disk (the last three being located in disk and tape drives 33). Any suitable operating system and associated interface (e.g., Microsoft Windows) may direct CPU 24. For example, the AIX operating system and AIX Windows windowing system can direct CPU 24. Other technologies also can be utilized in conjunction with CPU 24, such as touch-screen technology or human voice control.

Those skilled in the art will appreciate that the hardware depicted in FIG. 2 may vary for specific design applications and network configurations. In addition, main memory 44 is connected to system bus 26, and includes a control program 46. Control program 46 resides within main memory 44, and contains instructions that, when executed on CPU 24, carries out the operations depicted in FIG. 5 described herein.

Data processing system 10 may be included as a workstation node within a LAN such as a token ring network. A token ring network is a LAN formed in a closed loop configuration that utilizes token passing as a means of controlling data transmission among the on-line nodes. Token ring networks are designed to accommodate many different data processing systems including, but not limited to, microcomputers, minicomputers and mainframes. As explained above, multiple token rings linked by bridging devices to form a larger network, are referred to as token ring bridged network in which each token ring is a "segment".

Token ring networks typically utilize twisted pair cable, such as IBM's Shielded Twisted Pair cabling, as the transmission medium between nodes. FDDI (Fiber Distributed Data Interface) is an alternative token ring specification that utilizes optical fiber as the physical transmission medium. FDDI networks and emerging token ring networks may operate at a bandwidth of 100 Mbps, and FDDI networks may traverse distances of several kilometers. The media access control (MAC) protocol is utilized in FDDI token ring networks and is further described in the ANSI X.3.139-1987 and ISO 9314 standard, both incorporated herein by reference. Token rings networks are described in greater detail in the IEEE 802.5 standards which are also incorporated herein by reference. Many bridged token ring networks utilize star-shaped clusters of multiple nodes that are connected to a single connection device known as a Multi-station Access Unit (MSAU), that, in turn, is connected to the main ring. In FDDI systems, an analogous device is referred to as a wiring concentrator and is also commonly referred to as a Hub. "Hub" is a more generic and universal term that is utilized for token ring, FDDI, and ethernet systems and will be utilized hereinafter in the interest of uniformity. A token ring network configured utilizing Hubs is described in FIG. 3 below.

FIG. 3 is a simplified pictorial representation of a token ring source route bridge (SRB) network 300 that may be utilized in a preferred embodiment of the present invention. Token ring SRB network 300 is comprised of two token ring segments 318 and 320. Within token ring segment 318, FIG. 3 illustrates the above mentioned Multistation Access Unit (MSAU) configuration in which multiple Hubs are utilized. Token ring segment 318 includes multiple Hubs including Hub 302, Hub 304 and Hub 306. Each of the Hubs within token ring segment 318 acts as a wiring concentrator from which multiple nodes (referred to hereinafter as workstations), may be centrally connected in a star or cluster configuration. Such a star-shaped cluster is depicted in FIG. 3 as cluster 328 which is centralized at Hub 306 and is comprised of workstations 310, 312, 314, and 316. Token ring segment 318 is linked to another token ring segment 320 via a bridge 308. Bridge 308 may be one of many different types of devices utilized to connect networks. As depicted in FIG. 3, token ring segment 320 includes workstations 322, 324, and 326.

Thus, FIG. 3 illustrates a typical source route bridged network upon which the method and system of the present invention may be implemented. In what may be referred to as the "discovery phase" of the method and system of the present invention, network topology information is gathered for a network, such as token ring SRB network 300. This is accomplished with network analysis tools (not explicitly depicted) that may be placed within one or more nodes or bridges within a network. In general, these network analysis tools are currently utilized to gather information from transmission frames for the purpose of debugging a protocol or otherwise "tuning" network performance. In this way, the network analysis tools behave as filters when utilized to extract and collect transmission frames that contain particular information.

In accordance with the teachings of the method and system of the present invention, network analysis tools, referred to hereinafter as "collection devices", extract and collect transmission frames that contain routing information. This routing information is typically encapsulated within routing information fields (RIFs) contained within the transmission frames. Transmission frames and RIFs, as utilized in a preferred embodiment of the present invention, will be described in greater detail in FIGS. 4A and 4B respectively. The collection devices that are utilized to implement the discovery phase of the present invention may include a variety of devices or computer programs. Among the most well known of these collection devices are known by those skilled in the art as any of the following devices: Adapters, Sniffers, RMON probes etc. Those skilled in the art will appreciate and understand the extensions necessary to implement the functionality of such devices within Hubs, bridges, routers and other network devices or nodes.

It should be noted that some Hubs within a network, such as token ring SRB network 300, contain microprocessors such as CPU 24 and programs that may respond to requests from network management stations. As such, these Hubs may also serve as the points in the network from which RIFs are extracted from collected transmission frames, and parsed into data objects. In one embodiment of the present invention, the data objects are then delivered, upon request, to a network management station. In this embodiment the method and system of the present invention is implemented in a distributed manner in which multiple Hubs are utilized to collect and parse topology data. This is in contrast to a more "centralized" embodiment of the present invention in which a single network management station, located at one Hub, receives and processes all the RIF packets required.

Figure 4A:
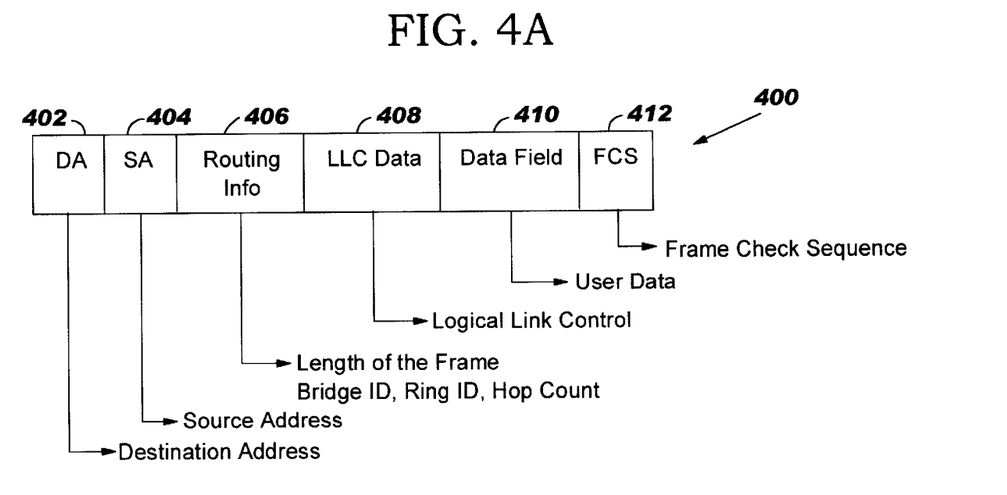
FIG. 4A is a simplified graphical representation of a token ring frame format that may be utilized in a preferred embodiment of the present invention.

Turning now to FIG. 4A, there is a simplified graphical representation of a token ring frame format that may be utilized in a preferred embodiment of the present invention. As illustrated in FIG. 4A, a token ring frame 400 includes multiple information fields. These information fields include Destination Address field 402, Source Address field 404, Routing Information field (RIF) 406, Logical Link Control (LLC) field 408, Data field 410, and Frame Check Sequence field 412. It should be noted that the composition of token ring frame 400 is only one of many possible frame formats that can be effectively utilized in accordance with the method and system of the present invention. Of particular interest to a user of the present invention is RIF 406 which, in turn, includes multiple routing information sub-fields.

Figure 4B:
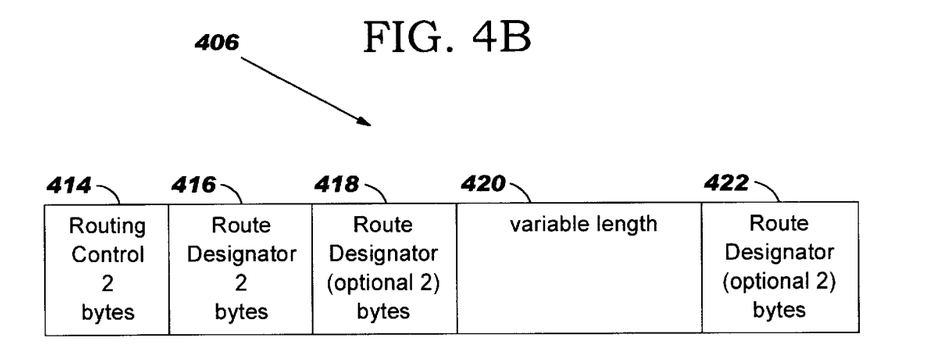
FIG. 4B is a simplified graphical representation of a routing information field (RIF) contained within the token ring frame format of FIG. 4A.

FIG. 4B depicts the information fields contained within RIF 406. These routing information sub-fields within RIF 406 include a Routing Control field 414, a fixed length (2 byte) Route Designator field 416, an optional 2 byte Route Designator field 418, a variable length Route Designator field 420, and an optional 2 byte Route Designator field 422. It should be noted that the set of parameters associated with the information fields depicted in FIGS. 4A and 4B are but one possible example and many other configurations may be utilized in accordance with the teachings of the present invention.

For purposes of implementing the method and system of the present invention, route designator fields 416, 418 and 422 are functionally equivalent. Therefore, for clarity of discussion and consistent with the teachings of the present invention, references to route designator field 416 will be construed as possibly including route designator fields 418 and 422. Route designator field 416, may be utilized to designate multiple network routes, and is comprised of two bytes, that are in turn comprised of specialized bit fields. These bit fields are designated to indicate, among other things, ring segment numbers and bridge numbers. The ring segment numbers are utilized within the network architecture to uniquely identify each token ring segment within the network. Similarly the bridge numbers provide the identification of each bridge within the network.

Typically, a token segment and bridge number are combined into a discrete route information package. For example, route designator field 416 may be comprised of any of the following 2-byte fields (4 hexadecimal numbers): 001,A; 002,B; 003,0. In this example, the first three digits indicate the ring segment number (001, 002, etc.) and the last digit indicates the bridge number (A, B, etc.).

In a preferred embodiment of the present invention, it is "raw" information frames, an example of which is depicted in FIG. 4A as token ring frame 400, that are identified and collected by any one of a number of possible collection devices including, but not limited to: Adapters, Sniffers, RMON probes, personal computers, switches, Hubs, Bridges, Routers, etc. The collection device is placed at a particular collection point in the network from which it reads the information frames from an input stream comprised of routine data transmissions. Once this "capture" phase is complete (after a predetermined period of 5 to 10 seconds, for example), the transmission frames are processed and analyzed to obtain the identities of ring segments and bridge. This ring segment/bridge information is typically contained within RIFs and are then analyzed and converted into data objects representing network interconnections.

This process embodies the discovery phase of the method and system of the present invention. Those skilled in the art will appreciate and understand that this discovery phase may be implemented within more than one of the above mentioned devices and would result in a distributed discovery phase corresponding to the network devices distributed throughout the network. With a distributed discovery phase, a centralized station could be utilized to query these collection devices for obtaining the data object files that each has collected, and instantiated each of these data objects into a centralized topology file. It should be noted that, in a preferred embodiment of the present invention, a distributed discovery phase, as described above, is implemented as a method and system for collecting token ring frames.

Figure 5:
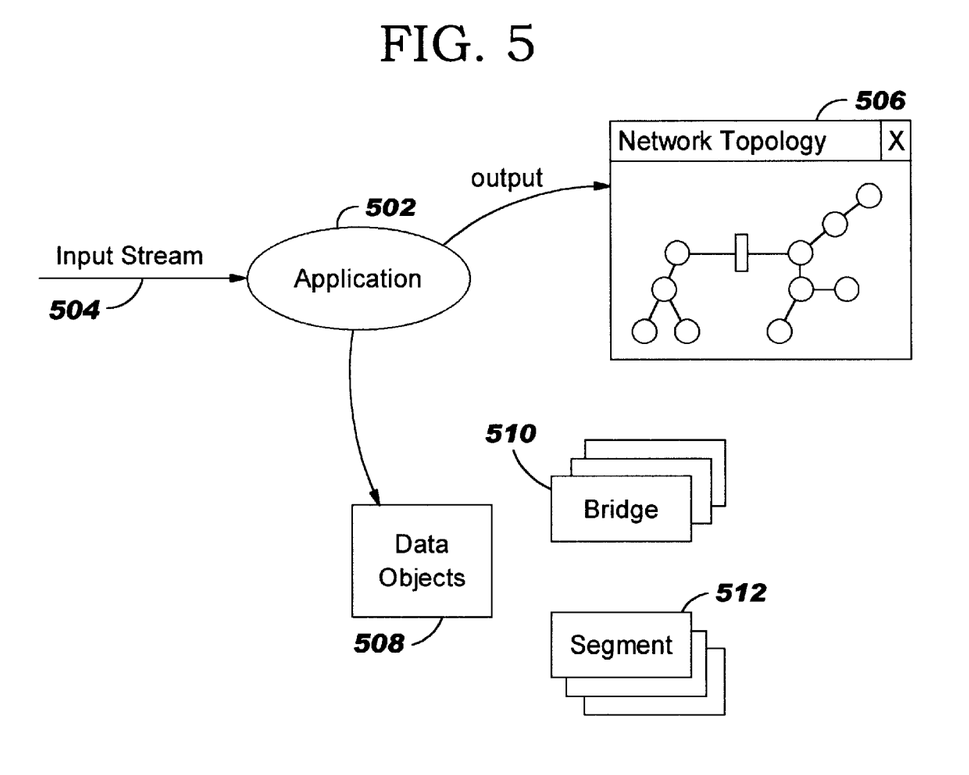
FIG. 5 is a block diagram illustrating a functional configuration of devices and entities utilized to discover and display network topology in accordance with the teachings of the present invention.

With reference now to FIG. 5, in which a block diagram 500 illustrates a functional configuration of devices and entities utilized to discover and display network topology in accordance with the teachings of the present invention. Block diagram 500 includes an input stream 504 of token ring frames, a processing application 502, a network topology output display 506, a collection of data objects 508, a set of bridge objects 510, and a set of token ring segment objects 512.

As discussed in the description of FIG. 4A and FIG. 4B, many different collection devices (sniffers, RMON probes, hubs, etc.) may be employed to identify and collect transmission frames that are delivered via input stream 504. Processing application 502 depicts a generic example of an entity that combines the functionality of the collection devices with the added ability to extract, parse, and convert RIFs contained within the token ring frames. Application 502 first identifies and captures token ring frames from input stream 504. In a preferred embodiment of the method and system of the present invention, application 502 contains a filtering mechanism utilized to identify a given frame as containing necessary routing information. This filtering mechanism will therefore cause application 502 to avoid collecting unneeded or redundant frames. Then, in accordance with the method and system of the present invention, application 502 then iterates through the collected frames and extracts information related to network topology (token ring segment identification numbers and bridge identification numbers, for example). This topology data may be obtained by extracting and analyzing RIFs within the collected frames and then parsing the resulting information in preparation for conversion into programming language data objects. This topology data is then parsed and stored by application 502 into data objects 508. The term "data object" is ordinarily utilized in the art to simply denote a collection of data referred to by a single name which can then be appropriately managed by an object oriented programming language such as JAVA or C++. Once the required data objects are gathered and stored, they may easily be utilized to provide a real time display of the topology of the entire interconnected token ring network.

In a preferred embodiment of the present invention, application 502 includes a JAVA application/applet that parses and stores data objects 508 as JAVA data objects. Data objects 508 include objects that represent token ring segments, such as token ring segment 318 and others that represent bridges, such as bridge 308. These two distinct classes of objects within data objects 508 is then separated utilizing application 502 into separate arrays of bridge objects 510 and token ring segment objects 512.

After a sufficient number of data packets from input stream 504 have been processed by application 502 as described above, data objects 508 will include a comprehensive set of network topology information as contained within bridge objects 510 and token ring segment objects 512. Application 502 will then iterate through bridge objects 510 and token ring segment objects 512 in order to provide a real time display of the interconnected topology of the token ring network from which input stream 504 was collected as illustrated by topology output display 506.

Figure 6:
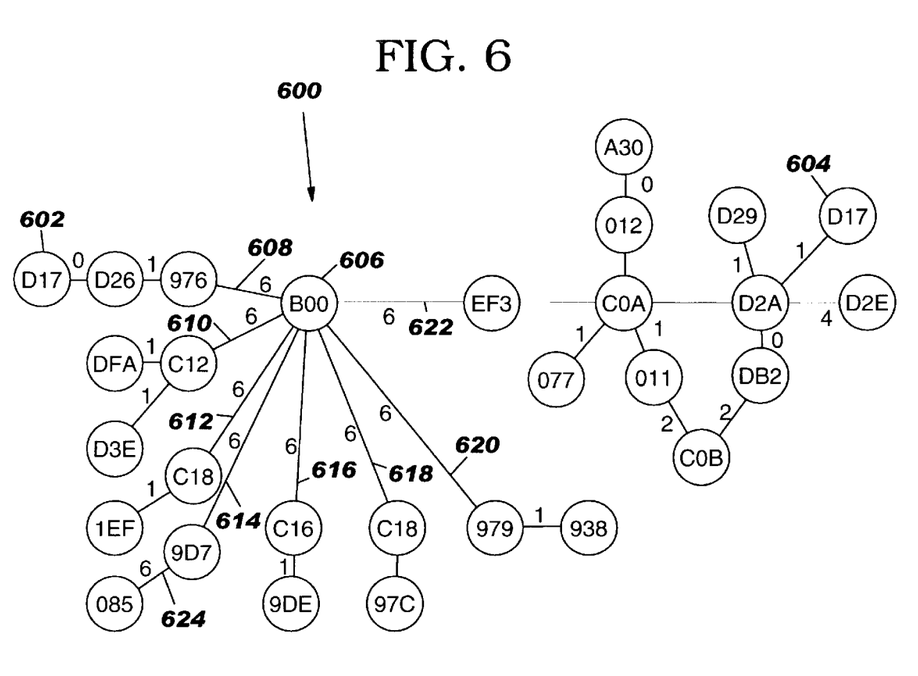
FIG. 6 depicts an example output display of a network topology in accordance with the teachings of the present invention.

An illustration of an implementation of the display phase of the present invention is illustrated in FIG. 6 which depicts an example output display 600. Output display 600 is a graphical representation that may be utilized to provide a real time visual display of the interconnected network topology to a user, such as a network manager. Display device 14 of FIG. 1 may be utilized as the medium by which output display 600 is exhibited.

The source route bridged token ring network topology depicted by output display 600 illustrates a simulated output display of topology data collected in accordance with the teachings of the present invention and includes multiple token ring segments, including segments 602, 604 and 606. These segments, along with others, are interconnected by several bridges that are depicted within output display 600 as lines connecting the segments. Note that, consistent with the segment and bridge identification scheme described within route designator field 416 of FIG. 4B, each segment and each bridge is assigned a particular numerical (hexadecimal in this case) identifier. Note that although the ring/bridge identification on each segment is never duplicated, the numbers utilized to identify bridges may be instantiated in multiple locations within output display 600 as illustrated by the multiple instantiations 608, 610, 612, 614, 616, 618, 620, 622, and 624, of a bridge assigned the number "6".

It is important to note that, while the present invention has been, and will continue to be, described in the context of a fully functional computer system, those skilled in the art will appreciate that the present invention is capable of being distributed as a program product in a variety of forms, and that the present invention applies equally regardless of the particular type of signal-bearing media utilized to actually carry out the distribution. Examples of signal-bearing media include: recordable-type media, such as floppy disks, hard disk drives, and CD ROMS, and transmission-type media such as digital and analog communication links.

Preferred implementations of the invention include implementations as a computer system programmed to execute the method or methods described herein, and as a program product. According to the computer system implementation, sets of instructions for executing the method and methods are resident in RAM of one or more computer systems configured generally as described above. Until required by the computer system, the set of instructions may be stored as a computer-program product in another computer memory, for example, in a disk drive (which may include a removable memory such as an optical disk or floppy disk for eventual utilization in disk drive).

The computer-program product can also be stored at another computer and transmitted when desired to the user's workstation by a network or by an external communications network. One skilled in the art can appreciate that the physical storage of the sets of instructions physically changes the medium upon which it is stored so that the medium carries computer-readable information. The change may be electrical, magnetic, chemical, or some other physical change.

While it is convenient to describe the invention in terms of instructions, symbols, characters, or the like, the reader should remember that all of these and similar terms should be associated with the appropriate physical elements. Thus, a method for implementing the present invention as depicted in FIG. 5, can be accomplished with a computer-aided device. In such a method, data stored in a memory unit of a data-processing system such as a data-processing system, can represent steps in a method for implementing a preferred embodiment of the present invention.

While the invention has been particularly shown as described with reference to a preferred embodiment, it will be understood by those skilled in the art that various changes in form and detail may be made therein without departing from the spirit and scope of the invention. For example, the present invention is applicable to other communication networks besides token ring architectures. Those skilled in the art will appreciate and understand the extensions necessary to apply the method and system of the present invention to other types of network topologies such as VLAN (virtual LAN) topologies. Such alternate network topologies are described in further detail in the 802.1Q standard which is incorporated herein by reference. It is therefore contemplated that such modifications can be made without departing from the spirit or scope of the present invention as defined in the appended claims.

What is claimed is:

1. A method for ascertaining and displaying the topology of a communications network that includes network access points, said communications network including transmission frames contained within a data stream utilized for routine data transmissions within said communications network, said transmission frames including routing information fields, said method comprising the steps of:

connecting a frame collection device to at least one of said network access points for collecting a plurality of transmission frames associated with the routine data transmissions;

extracting from said plurality of transmission frames data from at least one routing information field;

analyzing and parsing said routing information field data, thereby yielding interconnected topology data; and converting and storing said interconnected topology data into programming language data objects utilized to display the interconnected topology of said communications network.

2. The method of claim 1, wherein said step of collecting a plurality of transmission frames associated with the routine data transmissions, further comprises:

identifying and filtering transmission frames arriving at said at least one network access point such that unnecessary transmission frames are not collected.

3. The method of claim 1, wherein said communications network is a token ring source route bridged network, and wherein said step of collecting a plurality of transmission frames associated with the routine data missions, further comprises:

identifying and collecting token ring frames containing routing information fields for a predetermined period of time.

4. The method of claim 3, wherein said plurality of routing information fields include route designator fields, and wherein the step of analyzing and parsing routing information field data, further comprises:

identifying token ring segments and bridges, said token ring segments and bridges designated by bit fields contained within said route designator fields.

5. The method of claim 3, wherein said token ring source route bridged network includes a plurality of token ring segments, said token ring segments interconnected by at least one bridge, and wherein said step of converting and storing said interconnected topology data into programming language data objects, further comprises:

converting and storing said interconnected topology data into data objects, said data objects including token ring segment objects and bridge objects; and providing a graphical representation of interconnected topology data utilizing said token ring segment objects and said bridge objects.

6. The method of claim 5, further comprising the steps of:

storing said token ring segment objects in a segment array;

storing said bridge objects in a bridge array; and iterating through said segment array and said bridge array, such that an interconnected topology of said communications network may be graphically displayed.

7. The method of claim 1, wherein said network access points include hubs, nodes, or bridges.

8. The method of claim 7, wherein said communications network includes a centralized station, and wherein a plurality of frame collection devices are distributed among a plurality of collection locations within said communications network, said method further comprising the steps of:

querying said plurality of collection locations utilizing a program residing within said centralized station; and collecting all of said programming language data objects within said centralized station.

9. The method of claim 1, further comprising the step of:

display the interconnected topology of said communications network utilizing said programming language data objects.

10. The method of claim 1, wherein the step of converting and storing said interconnected topology data from said plurality of routing information fields into programming language data objects, comprises:

converting and storing said interconnected topology data into JAVA data objects.

11. An information handling system for ascertaining and displaying the topology of a communications network, said communications network including transmission frames contained within a data stream utilized for routine data transmissions within said communications network, said transmission frames including routing information fields, said information handling system comprising:

means for identifying and collecting a plurality of transmission frames associated with the routine data transmissions, wherein said means for identifying and collecting a plurality of transmission frames includes means for identifying and collecting token ring frames containing routing information fields for a predetermined period of time;

means for extracting a plurality of routing information fields from said plurality of transmission frames;

means for analyzing and parsing said plurality of routing information fields, thereby yielding interconnected topology data; and means for converting and storing said interconnected topology data from said plurality of routing information fields into programming language data objects, such that said data objects may thereafter be utilized to display the interconnected topology of said communications network, said communications network including a plurality of token ring segments interconnected by at least one bridge, and wherein said means for converting and storing said interconnected topology data from said plurality of muting information packets into programming language data objects, includes:

means for converting and storing said interconnected topology data into token ring segment objects or bridge objects; and means for providing a graphical representation of interconnected topology data utilizing said token ring segment objects and said bridge objects.

12. The information handling system of claim 11, wherein said means for identifying and collecting a plurality of transmission frames associated with routine data transmissions, further comprises:

means for filtering said plurality of transmission frames such that unnecessary transmission frames are not collected.

13. The information handling system of claim 11, wherein said communications network is a token ring source route bridged network.

14. The information handling system of claim 13, wherein said plurality of routing information fields include route designator fields, and wherein said means for analyzing and parsing said plurality of routing information fields, further comprises:

means for identifying token ring segments and bridges, said token ring segments and bridges designated by bit fields contained within said route designator fields.

15. The information handling system of claim 11, further comprising:

means for storing said token ring segment objects in a segment array;

means for storing said bridge objects in a bridge array; and means for iterating through said segment array and said bridge array, such that an interconnected topology of said communications network may be graphically displayed.

16. The information handling system of claim 11, wherein said communications network includes network access points, said network access points including hubs, nodes, and bridges, and wherein said means for identifying and collecting a plurality of transmission frames associated with routine data transmissions further comprises:

at least one frame collection device for collecting said transmission frames within at least one network access point.

17. The information handling system of claim 16, wherein said communications network includes a centralized station, and wherein said at least one frame collection device is distributed among a plurality of collection locations within said communications network, said information handling system further comprising:

a program residing within said centralized station for querying said plurality of collection locations; and a program residing within said centralized station for collecting all of said programming language data objects within said centralized station.

18. The information handling system of claim 11, wherein said means for converting and storing said interconnected topology data from said plurality of routing information fields into programming language data objects, comprises:

means for converting and storing said interconnected topology data into JAVA data objects.

19. A computer program product stored in signal bearing media for ascertaining and displaying the topology of a communications network, said communications network including transmission frames contained within a data stream utilized for routine data transmissions within said communications network, said transmission frames including routing information fields, said computer program product comprising:

instruction means for identifying and collecting a plurality of transmission frames associated with the routine data transmissions, wherein said instruction means for identifying and collecting a plurality of transmission frames associated with routine data transmissions, includes instruction means for identifying and collecting token ring frames containing routing information fields for a predetermined period of time;

instruction means for extracting a plurality of routing information fields from said plurality of transmission frames;

instruction means for analyzing and parsing said plurality of routing information fields, thereby yielding interconnected topology data; and instruction means for converting and storing said interconnected topology data from said plurality of routing information fields into programming language data objects, such that said data objects may thereafter be utilized to display the interconnected topology of said communications network, wherein said communications network includes a plurality of token ring segments interconnected by at least one bridges and wherein said instruction means for converting and storing said interconnected topology data into programming language data objects, further comprises:

instruction means for parsing and storing said interconnected topology data into data objects, said data objects including token ring segment objects and bridge objects; and instruction means for providing a graphical representation of interconnected topology data utilizing said token ring segment objects and said bridge objects.

20. The computer program product of claim 19, wherein said instruction means for identifying and collecting a plurality of transmission frames associated with routine data transmissions, further comprises:

instruction means for filtering said plurality of transmission frames such that unnecessary transmission frames are not collected.

21. The computer program product of claim 19, wherein said communications network is a token ring source route bridged network.

22. The computer program product of claim 21, wherein said plurality of routing information fields include route designator fields, and wherein said instruction means for analyzing and parsing said plurality of routing information fields, further comprises:

instruction means for identifying token ring segments and bridges, said token ring segments and bridges designated by bit fields contained within said route designator fields.

23. The computer program product of claim 19, further comprising:

instruction means for storing said token ring segment object in a segment array;

instruction means for storing said bridge objects in a bridge array; and instruction means for iterating through said segment array and said bridge array, such that an interconnected topology of said communications network may be graphically displayed.

24. The computer program product of claim 19, wherein said communications network includes network access points, said network access points including hubs, nodes, and bridges, and wherein said instruction means for identifying and collecting a plurality of transmission frames associated with routine data transmissions further comprises:

instruction means for collecting said transmission frames within at least one network access point.

25. The computer program product of claim 24, wherein said communications network includes a centralized station, and wherein said instruction means for collecting said transmission frames is distributed among a plurality of collection locations within said communications network, said computer program product further comprising:

instruction means for querying said plurality of collection locations; and    instruction means for collecting all of said programming language data objects within said centralized station.

26. The computer program product of claim 19, wherein said instruction means for parsing and storing said interconnected topology data from said plurality of routing information fields into programming language data objects, comprises:

instruction means for parsing and storing said interconnected topology data into JAVA data objects.

\* \* \* \* \*